(12) United States Patent
Takahashi (10) Patent No.: US 7,758,288 B2
(45) Date of Patent: Jul. 20, 2010

(54) EXPANDED HOLE DRILLING DEVICE AND COMPONENT FOR THE EXPANDED HOLE DRILLING DEVICE

(76) Inventor: Shigetoshi Takahashi, 16-6-A101, Kasuga-cho 1-chome, Nerima-ku, Tokyo 1790074 (JP)

( * ) Notice: Subject to any disclaimer, the term of this patent is extended or adjusted under 35 U.S.C. 154(b) by 686 days.

(21) Appl. No.: 11/667,562

(22) PCT Filed: Dec. 22, 2005

(86) PCT No.: PCT/JP2005/023561

§ 371 (c)(1),
(2), (4) Date: May 11, 2007

(87) PCT Pub. No.: WO2006/077713

PCT Pub. Date: Jul. 27, 2006

(65) Prior Publication Data

US 2008/0014034 A1    Jan. 17, 2008

(30) Foreign Application Priority Data

Jan. 24, 2005    (JP) .............................. 2005-014961

(51) Int. Cl.
*B23B 49/00* (2006.01)
(52) U.S. Cl. .......................... 408/201; 408/75; 408/81; 33/638; 33/642
(58) Field of Classification Search .................... 408/13, 408/79–83, 75, 113, 201; 33/632, 638, 642; *B23B 49/00*
See application file for complete search history.

(56) References Cited

U.S. PATENT DOCUMENTS

| | | | | |
|---|---|---|---|---|
| 2,481,939 A | * | 9/1949 | Miller | .......................... 82/158 |
| 2,994,131 A | * | 8/1961 | Gaylord | ....................... 33/642 |
| 3,601,897 A | * | 8/1971 | Muller | ......................... 33/642 |

(Continued)

FOREIGN PATENT DOCUMENTS

JP        52-133399        10/1977

(Continued)

OTHER PUBLICATIONS

Partial translation of first office action issued Feb. 22, 2005 (1 Sheet.).

*Primary Examiner*—Daniel W Howell
(74) *Attorney, Agent, or Firm*—Kratz, Quintos & Hanson, LLP (57) ABSTRACT

There are provided an expanded hole drilling device, a component for the expanded hole drilling device, and an expanded hole drilling method, capable of expanding the diameter of a previously bored hole to a large diameter without causing decentering. The expanded hole drilling device 10 includes a drill holder 22 that is attached to a drill grasping part 18 in place of a drill 16 and grasps the drill 16, and a centering attachment 24 having a conical tip end part, which is attached to the drill holder 22. The expanded hole drilling method includes a step of arranging a bored workpiece displaceably on a table 14, a step of performing centering by inserting the tip end part of the centering attachment 24 into a bored hole, a step of fixing the centered workpiece on the table 14, and a step of drilling the workpiece to expand the hole by using the drill 16 after the centering attachment 24 has been removed.

2 Claims, 11 Drawing Sheets

U.S. PATENT DOCUMENTS

| | | | | |
|---|---|---|---|---|
| 3,606,563 A | * | 9/1971 | Matsumoto | 408/200 |
| 3,674,375 A | * | 7/1972 | Reed et al | 408/103 |
| 3,884,593 A | * | 5/1975 | Christoffer | 408/16 |
| 4,969,781 A | * | 11/1990 | Fahrner et al. | 408/79 |
| 6,409,437 B1 | * | 6/2002 | Metzger | 408/80 |
| 6,881,017 B1 | * | 4/2005 | Krecek et al. | 408/204 |

FOREIGN PATENT DOCUMENTS

| | | | |
|---|---|---|---|
| JP | 54128078 A | * | 10/1979 |
| JP | 55-50709 | | 4/1980 |
| JP | 57-9434 | | 1/1982 |
| JP | 8-187722 | | 7/1996 |
| JP | 2001-9619 | | 1/2001 |

* cited by examiner

EXPANDED HOLE DRILLING DEVICE AND COMPONENT FOR THE EXPANDED HOLE DRILLING DEVICE

TECHNICAL FIELD

The present invention relates to an expanded hole drilling device for drilling a previously bored hole so as to expand the hole, and a component for the expanded hole drilling device.

BACKGROUND ART

It is sometimes necessary to expand the diameter of a hole previously bored in an object to be drilled. Such necessity arises widely in the case where a large-diameter hole is formed by using a large-size or special device in civil engineering and construction and also in the case where a relatively small-diameter hole is formed by using a general-purpose device in the machining of an assembled part.

As an example of the latter case, in model making, part machining of precision machinery, and the like, it is sometimes necessary that a hole be formed in a workpiece by using a lathe, milling machine, drilling machine, or the like, and then the diameter of the hole be expanded to form a large-diameter hole.

In this case, centering for causing the center of the hole bored previously in the workpiece and the center of the expanded hole, in other words, the center of the hole bored previously in the workpiece and the center of a drill for forming the expanded hole to coincide with each other is not necessarily easy to perform. It is needless to say that if the expanded hole is drilled in a decentering state, various troubles occur, for example, when the workpiece is assembled by using a screw or the like.

In the case where the large-diameter hole is formed, the trouble caused by decentering does not necessarily present a big problem as compared with the necessity for contrivance for surely performing the hole expanding work itself. In contrast, in the case where the small-diameter hole is formed, the trouble cannot be neglected.

For example, in model making, a process in which many workpieces formed of a metallic material are placed on a table in a lapped manner, and a through hole having a diameter of about several millimeters are drilled collectively in the workpieces is favorable for the subsequent work. Thereafter, the diameter of the previously bored hole is expanded by drilling the hole again to form a through hole having a different larger diameter, which is finally necessary for each workpiece, for each of the workpieces.

Also, when a countersinking process, in which the head of a fastening member such as a screw installed in the hole in the workpiece is embedded within the hole, is necessary, work for machining the open end of the previously bored hole into a tapered shape is performed separately. It can be said that this countersinking process is also one of jobs for expanding the diameter of the previously bored hole.

Needless to say, the work for expanding the diameter of the hole including the countersinking work may sometimes become necessary similarly even in the case where a non-penetrating bottomed hole is formed in one workpiece.

On the industrial base for handling workpieces in large quantities, the work for expanding the diameter of the hole can be performed easily and exactly by using an NC (numerically controlled) lathe capable of performing positioning etc. easily, or a hole having a desired diameter for each workpiece can also be bored directly with ease without performing boring work twice.

Also, as a method for further expanding a hole having a diameter as large as, for example, about several tens millimeters or more, a boring method using, for example, a core drill can be cited. In this case, to perform stable work, an auxiliary tool having a unique shape according to the feature of boring device is sometimes used (for example, refer to Patent Document 1).

Also, there have been disclosed a centering bar the tip end of which is tapered to perform centering by utilizing the taper (refer to Patent Document 2), a device to which a center pin having a taper-shaped tip end is attached to automatically cause the center of a previously bored hole and the center of the main spindle of finishing machine to mechanically coincide with each other (refer to Patent Document 3), and a centering tool engagingly fitted on one side of a socket the other side of which is attached detachably to the tool of a machine tool so that the head of a needle having a head of spherical shape etc. is turnable (refer to Patent Document 4).

Patent Document 1: Japanese Patent Laid-Open No. 2001

Patent Document 2: Microfilm of Japanese Utility Model Application No. 51-42802 (Japanese Utility Model Laid-Open No. 52-133399)

Patent Document 3: Microfilm of Japanese Utility Model Application No. 55-85018 (Japanese Utility Model Laid-Open No. 57-9434)

Patent Document 4: Microfilm of Japanese Utility Model Application No. 53-130177 (Japanese Utility Model Laid-Open No. 55-50709)

In the above-described model making etc. performed by an individual in the home as a hobby, holes are usually bored by using an inexpensive mini-lathe etc. Therefore, the work for drilling an expanded hole by performing centering is considerably troublesome. The same is true for the case where holes are bored by using the mini-lathe etc. in the work for machining and assembling precision parts of a relatively small lot. Such a problem is not necessarily solved sufficiently by the above-described related arts.

The present invention has been made in view of the above-described problems, and accordingly an object thereof is to provide an expanded hole drilling device capable of expanding the diameter of a previously bored hole to a larger diameter without causing decentering by using a simple method using a simple device, and a component for the expanded hole drilling device.

DISCLOSURE OF THE INVENTION

To achieve the above object, the expanded hole drilling device in accordance with the present invention includes a table having a fixing element for detachably fixing a bored workpiece; and a hole drilling part having a drill grasping part to which a drill capable of drilling a hole having a diameter lager than that of a bored hole is attached, and is characterized in that the device has a drill holder attached to the drill grasping part in place of the drill; and a centering attachment having a diameter larger than that of the drill holder, the centering attachment being attached to the free end part of the drill holder on the side opposite to the side on which the drill holder is attached to the drill grasping part, the free end part of the drill holder is formed into a conical shape having the same axis line as that of the drill at the time when being attached to the drill grasping part, and a hole part in which the drill is insertably fitted is formed in the free end part, the hole part having the same axis line as that of the conical shape, and for the centering attachment, in the end part on the side of being attached to the free end part of the drill holder, there are formed a taper-shaped opening in which the free end part of the drill holder is insertably fitted, the taper-shaped opening having the same axis line as that of the drill holder, and a hole part that communicates with the taper-shaped opening and has a space capable of accommodating the exposed part of the drill attached to the drill holder, and also the other end part is formed into a conical shape having the same axis line as that of the hole part.

Also, the component for an expanded hole drilling device in accordance with the present invention consists of a drill holder attached to a drill grasping part in place of a drill; and a centering attachment having a diameter larger than that of the drill holder, the centering attachment being attached to the free end part of the drill holder on the side opposite to the side on which the drill holder is attached to the drill grasping part, and is characterized in that the free end part of the drill holder is formed into a conical shape having the same axis line as that of the drill at the time when being attached to the drill grasping part, and a hole part in which the drill is insertably fitted is formed in the free end part, the hole part having the same axis line as that of the conical shape, and for the centering attachment, in the end part on the side of being attached to the free end part of the drill holder, there are formed a taper-shaped opening in which the free end part of the drill holder is insertably fitted, the taper-shaped opening having the same axis line as that of the drill holder, and a hole part that communicates with the taper-shaped opening and has a space capable of accommodating the exposed part of the drill attached to the drill holder are formed, and also the other end part is formed into a conical shape having the same axis line as that of the hole part.

The expanded hole drilling device and the component for the expanded hole drilling device in according to the present invention can form an expanded hole without decentering by a simple method using a simple device by inserting the centering attachment or a centering member having a conical tip end part having the same axis line as that of the drill at the time when being attached to the drill grasping part into a previously bored hole to perform centering.

DESCRIPTION OF SYMBOLS 10, 10a expanded hole drilling device
12 fixing element
14 table
16, 16a, 16b, 16c drill
18 drill grasping part
20 component for expanded hole drilling device
22 drill holder
24, 24a centering attachment

BEST MODE FOR CARRYING OUT THE INVENTION

An embodiment of the present invention will now be described with reference to the accompanying drawings.

First, an expanded hole drilling device of the present invention is explained with reference to FIG. 1.

Figure 1:
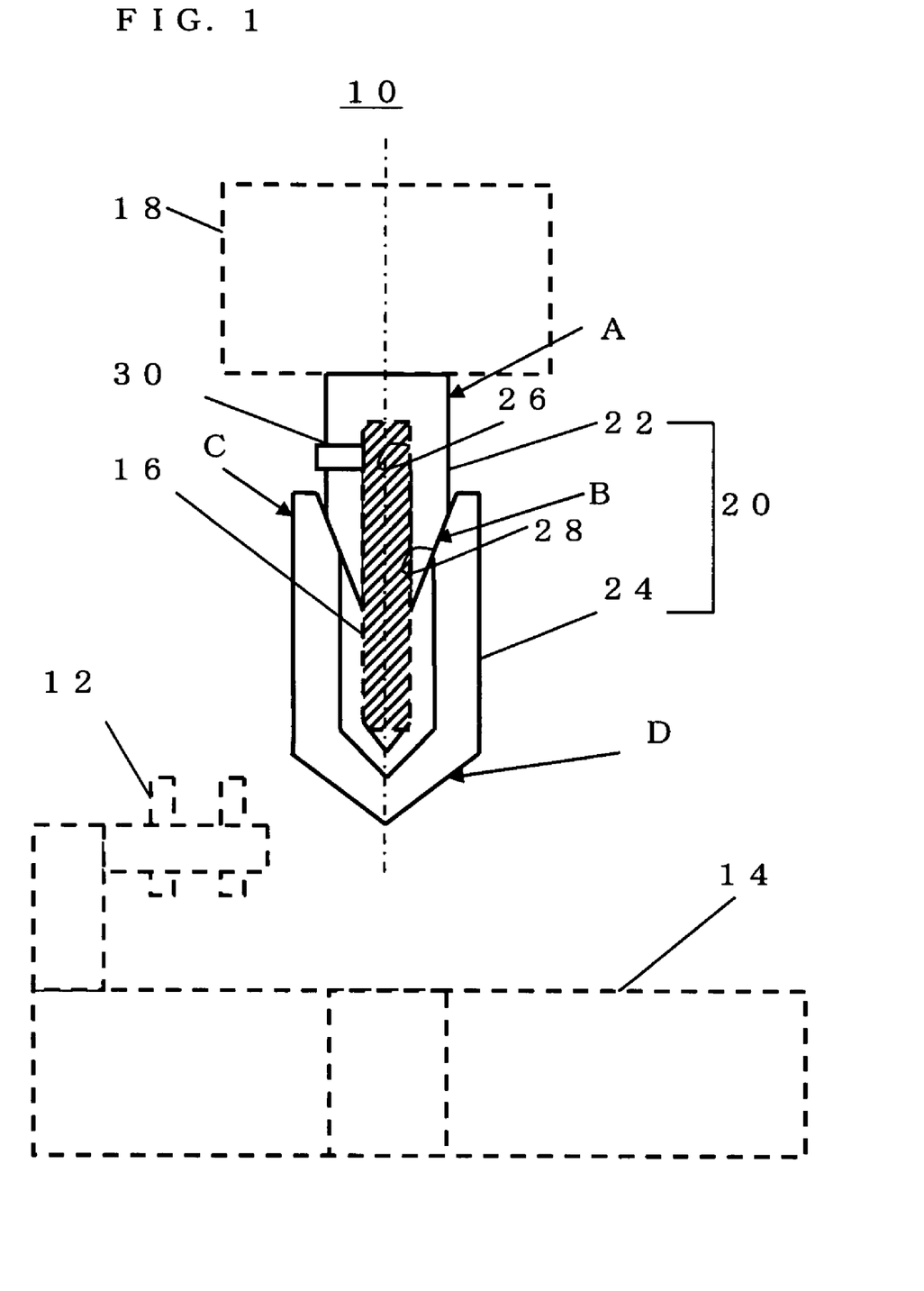
FIG. 1 is a schematic view showing a general configuration of an expanded hole drilling device of the present invention.

As shown by a broken line in FIG. 1, the expanded hole drilling device 10 of the present invention includes a table 14 having a fixing element 12 for detachably fixing a bored workpiece (not shown in FIG. 1) and a hole drilling part having a drill grasping part 18 that can drill a hole having a diameter larger than that of a bored hole and is fitted detachably with a drill 16 of, for example, a helical flute type. Although the general configuration of the hole drilling part is not shown, the hole drilling part includes an ordinary drilling function provided with a power source, a control panel, and the like for controlling the drill 16 grasped by the drill grasping part 18. The expanded hole drilling device can use a commercially available, low-cost and simple lathe, milling machine, drilling machine, or the like as far as it has the above-described function and construction at the minimum. Also, any other appropriate expanded hole drilling device can be used as far as it has the above-described function and construction.

As shown by a solid line in FIG. 1, the expanded hole drilling device 10 of the present invention further includes, as a component 20 for the expanded hole drilling device for performing the drilling of expanded hole, a drill holder 22 attached to the drill grasping part 18 in place of the drill 16 and a centering attachment 24 having a diameter larger than that of the drill holder 22, the centering attachment 24 being attached to the free end part (indicated by an arrow mark B in FIG. 1) of the drill holder 22 on the side opposite to the side on which the drill holder 22 is attached to the drill grasping part 18 (indicated by an arrow mark A in FIG. 1).

The drill holder 22 is formed into a conical shape having the same axis line as that of the drill 16 (shown by chain lines in FIG. 1) when the free end part is attached to the drill grasping part 18, and a hole part 26 in which the drill 16 is fitted insertably is formed in the free end part, the hole part 26 having the same axis line as that of the conical shape.

The drill grasping part 18 to which the drill holder 22 is attached can adopt an appropriate chuck system such as what is called a drill chuck system or a collet chuck system. However, from the viewpoint of more reliable prevention of oscillation of the drill holder 22, the collet chuck system is preferable.

In FIG. 1, reference numeral 30 denotes a retaining element for surely fixing the drill 16 attached to the drill holder 22 to the drill holder 22.

The centering attachment 24 is formed with a hole part 28, the hole part 28 having a taper-shaped opening having the same axis line as that of the drill holder 22, which opening is used for insertably attaching the free end part of the drill holder 22 to the end part (indicated by an arrow mark C in FIG. 1) on the side on which the centering attachment 24 is attached to the free end part of the drill holder 22, and a space communicating with the taper-shaped opening, which space can accommodate the exposed part of the drill 16 attached to the drill holder 22. Also, the other end part (indicated by an arrow mark D in FIG. 1) of the centering attachment 24 is formed into a conical shape having the same axis line as that of the hole part 28.

For the drill 16 used for boring a workpiece previously and expanding the bored hole, drills of a plurality of sizes are used according to the diameter of the hole to be drilled. For the drills of the plurality of sizes, the diameters and exposed lengths thereof on the side of being exposed from the drill holder 22 and accommodated in the hole part 28 of the centering attachment 24 are different. Also, when the countersinking process explained in the section of Background Art is performed, the diameter of the drill 16 on the side of being accommodated in the hole part 28 of the centering attachment 24 becomes especially large.

Therefore, a plurality of replaceable drill holders 22 are usually prepared according to the kind of the drill 16. In this case, the diameter of the hole part 26 of the drill holder 22 must be changed according to the kind of the drill 16. In contrast, the outside diameters of the drill holders 22 can have a fixed size according to the drill grasping part 18. On the other hand, for the centering attachment 24, considering the above-described respect, a plurality of centering attachments 24 having different diameters and depths of the hole part 28 are preferably prepared. Instead, only one centering attachment 24 formed with the hole part 28 having a sufficient large diameter and depth may be prepared. If the outside diameters of the drill holders 22 are made fixed, the diameters of the hole parts 28 in the plurality of centering attachments 24 can also be made fixed.

It is desirable that the drill holder 22 and the centering attachment 24 be manufactured with a dimensional accuracy as high as possible for the purpose of usage thereof. Also, similarly, it is desirable that the conical outer surface of the drill holder 22 and the inner surface of the taper-shaped opening of the centering attachment 24, which are engaged with each other, be finished as smoothly as possible, preferably be mirror finished. At this time, as the taper shape, the shape of, for example, MT (Morse taper: JIS B 4003) #2 can be used suitably.

Also, the drill holder 22 and the centering attachment 24 can use an appropriate metallic material as far as the metallic material has sufficient wear resistance and high rigidity.

Next, the expanded hole drilling method of the present invention is explained with reference to FIGS. 2 to 9 taking the case where the expanded hole drilling device 10 of the present invention explained above is used as an example.

The expanded hole drilling method of the present invention includes a step of displaceably arranging a bored workpiece on the table (hereinafter referred to as an arranging step), a step of performing centering of a hole by inserting the tip end part of a centering member having a conical tip end part having the same axis line as that of the drill at the time of being attached to the hole drilling part, the centering member being attached detachably to the hole drilling part to which the drill is attached, into the hole (hereinafter referred to as a centering step), a step of fixing the centered workpiece on the table (hereinafter referred to as a fixing step), and a step of drilling a hole having a diameter larger than that of the previously bored hole so as to expand the previously bored hole by using a borable drill after the centering member has been removed from the hole drilling part (hereinafter referred to as a drilling step).

Hereunder, these steps are explained successively.

Figure 2:
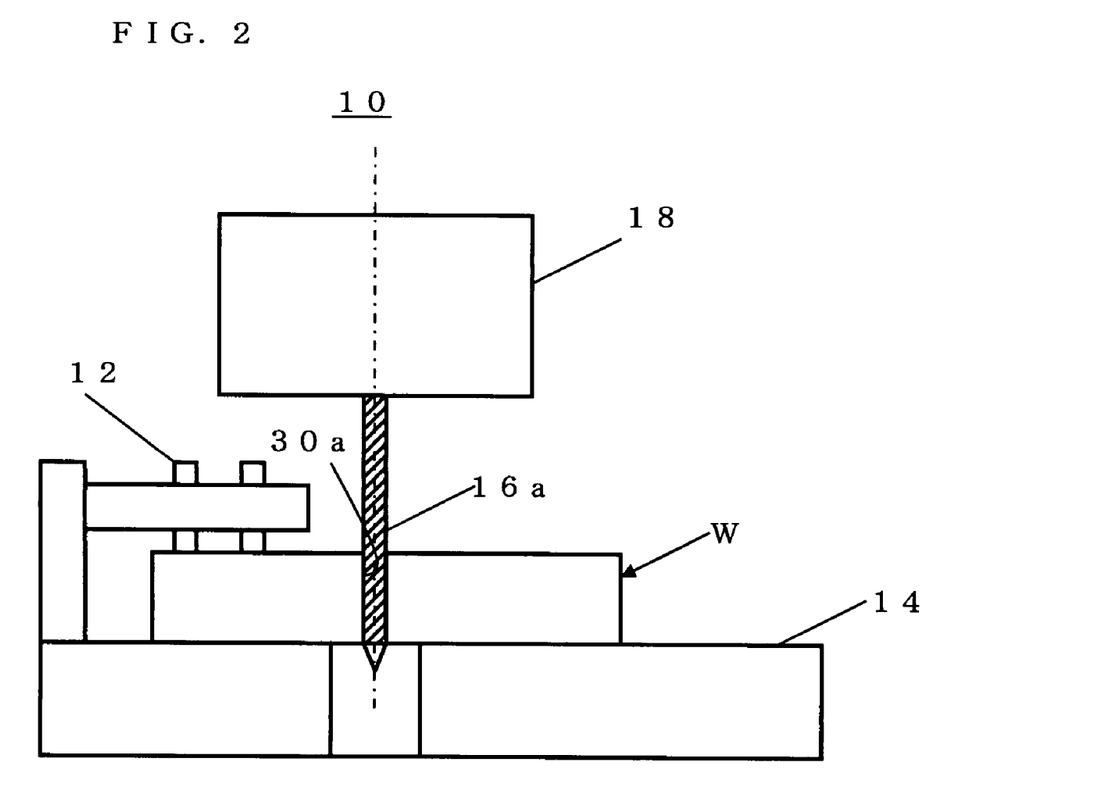
FIG. 2 is an explanatory view for explaining an expanded hole drilling method of the present invention, showing a state of an expanded hole drilling device in a step of forming a small-diameter hole previously in a workpiece.

The expanded hole drilling method of the present invention is to drill a workpiece (indicated by an arrow mark W in FIG. 2) in which a hole 30a having a small diameter has been formed previously with a small-diameter drill 16a by using the expanded hole drilling device 10 in the state in which the component 20 for the expanded hole drilling device is not attached as shown in FIG. 2, in other words, by using the ordinary hole drilling device.

The application, the material selected according to the application, and the like of the workpiece W are not subject to any special restriction. However, as explained in the section of Problems to be Solved by the Invention, the present invention can achieve its effect more suitably when metallic model parts used in model making, metallic precision parts of a relatively small lot, and the like are drilled by a low-cost and simple device.

Figure 3:
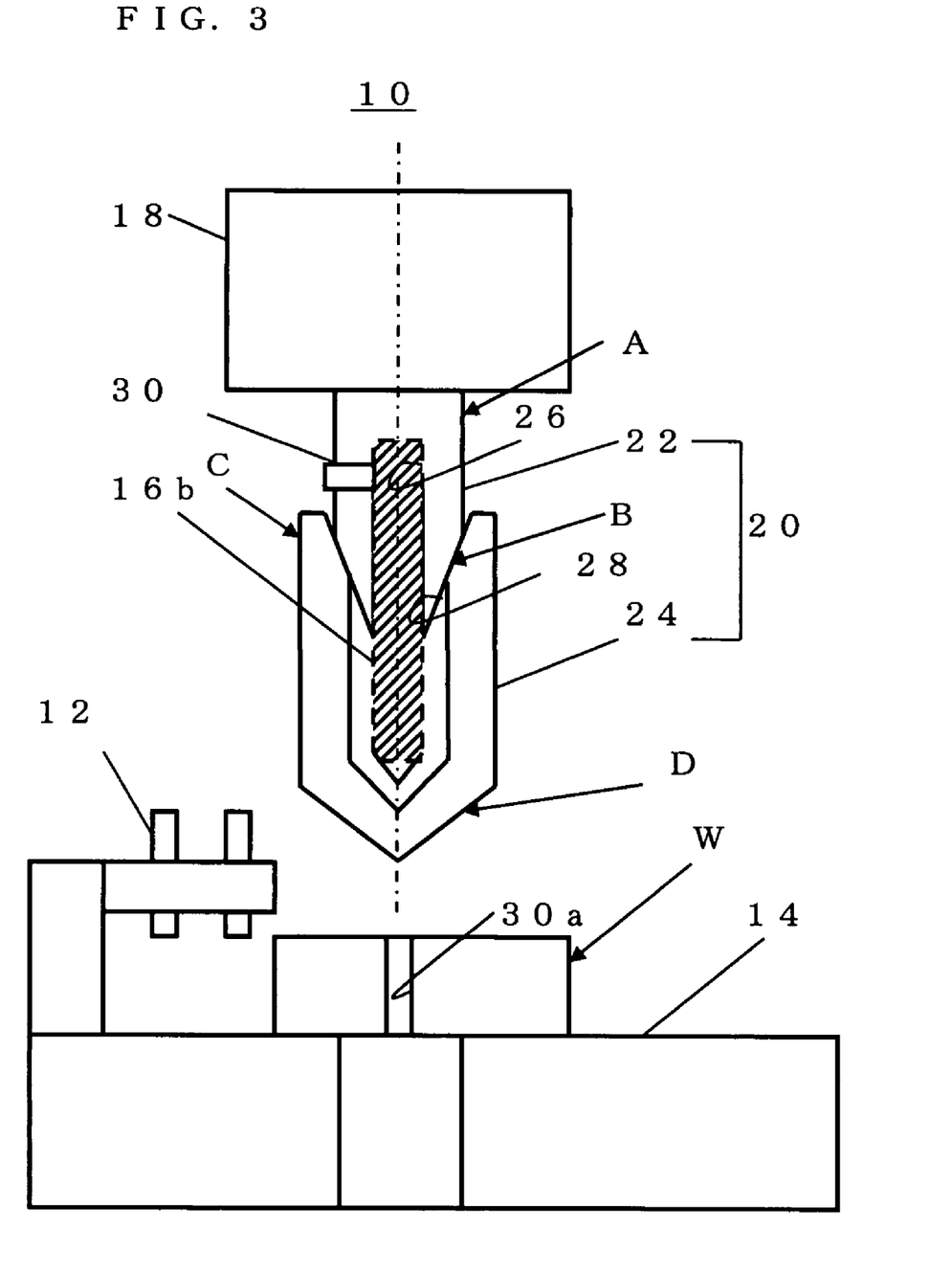
FIG. 3 is an explanatory view for explaining an expanded hole drilling method of the present invention, showing a state of an expanded hole drilling device in an arranging step of arranging a bored workpiece on a table and attaching a centering member to a drill grasping part.

In the arranging step, as shown in FIG. 3, the state in which the workpiece W in which the hole 30a has been bored is arranged on the table 14, that is, the state shown in FIG. 2 is changed to the state in which the fixing element 12 is removed to make the workpiece W displaceable. At this time, the workpiece W may be held by putting a hand on the workpiece W.

On the other hand, the component 20 for the expanded hole drilling device (centering member) is attached to the hole drilling part. Specifically, the drill 16a is removed from the drill grasping part 18, the drill holder 22 is attached to the drill grasping part 18, and a drill 16b having a large diameter, which is capable of expanding the hole 30a to a desired size, is attached to the drill holder 22. Further, the conical portion of the drill holder 22 is inserted into and engaged with the taper-shaped opening of the centering attachment 24 so that the exposed part of the drill 16b is accommodated in the hole part 28, by which the centering attachment 24 is attached to the drill holder 22.

The drill holder 22 and the centering attachment 24 are attached so as to have the same axis line as that of the drill grasping part 18, in other words, so as to have the same axis line as that of the drill at the time when being attached to the drill grasping part 18 (the drill 16a in the state shown in FIG. 2).

Figure 4:
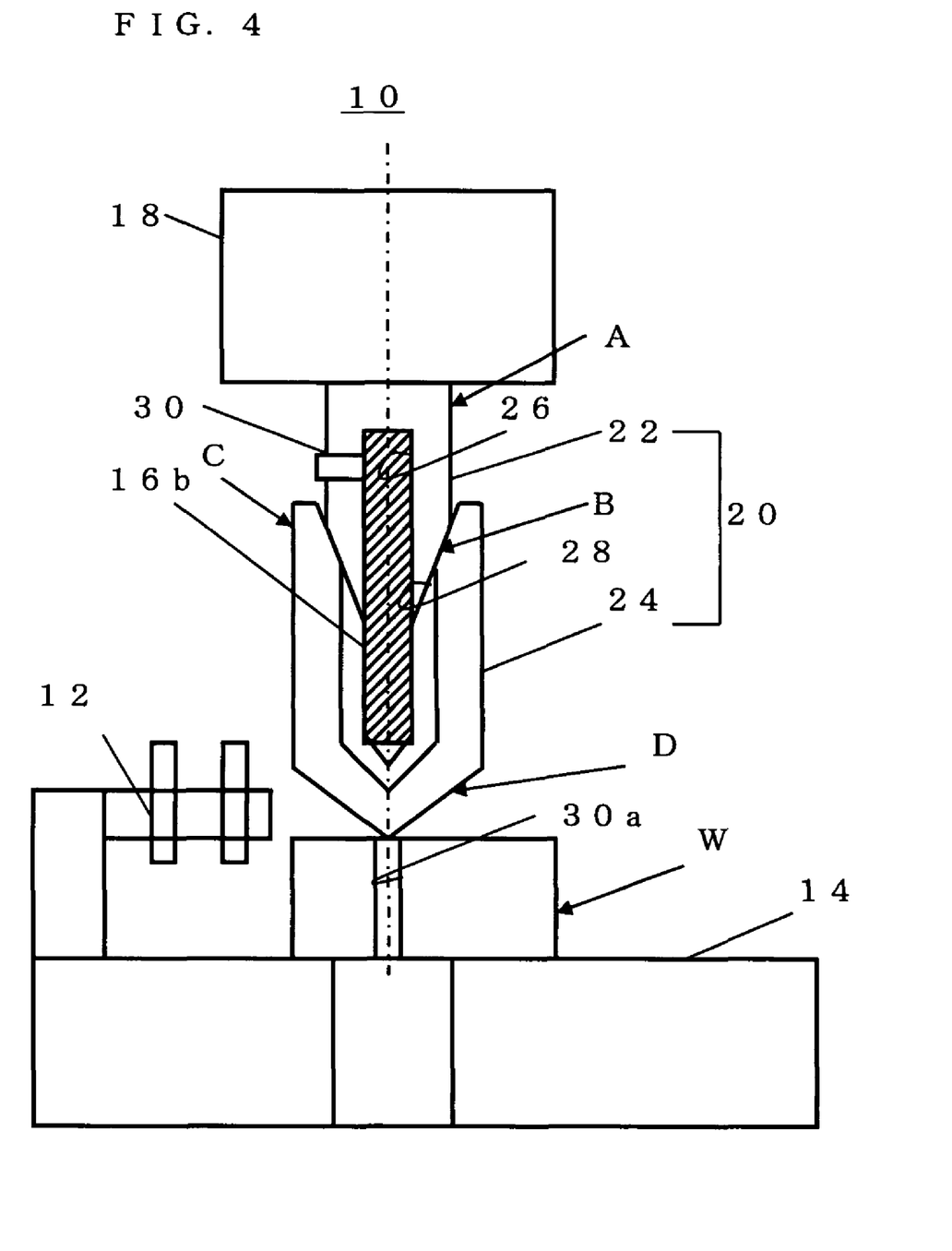
FIG. 4 is an explanatory view for explaining an expanded hole drilling method of the present invention, showing a state of an expanded hole drilling device in a centering step of performing centering by inserting the tip end of a centering member into a hole.

In the centering step, as shown in FIG. 4, the conical tip end part of the centering attachment 24, in other words, the tip end part of the centering member is inserted into the hole 30a to perform the centering of hole.

Figure 5:
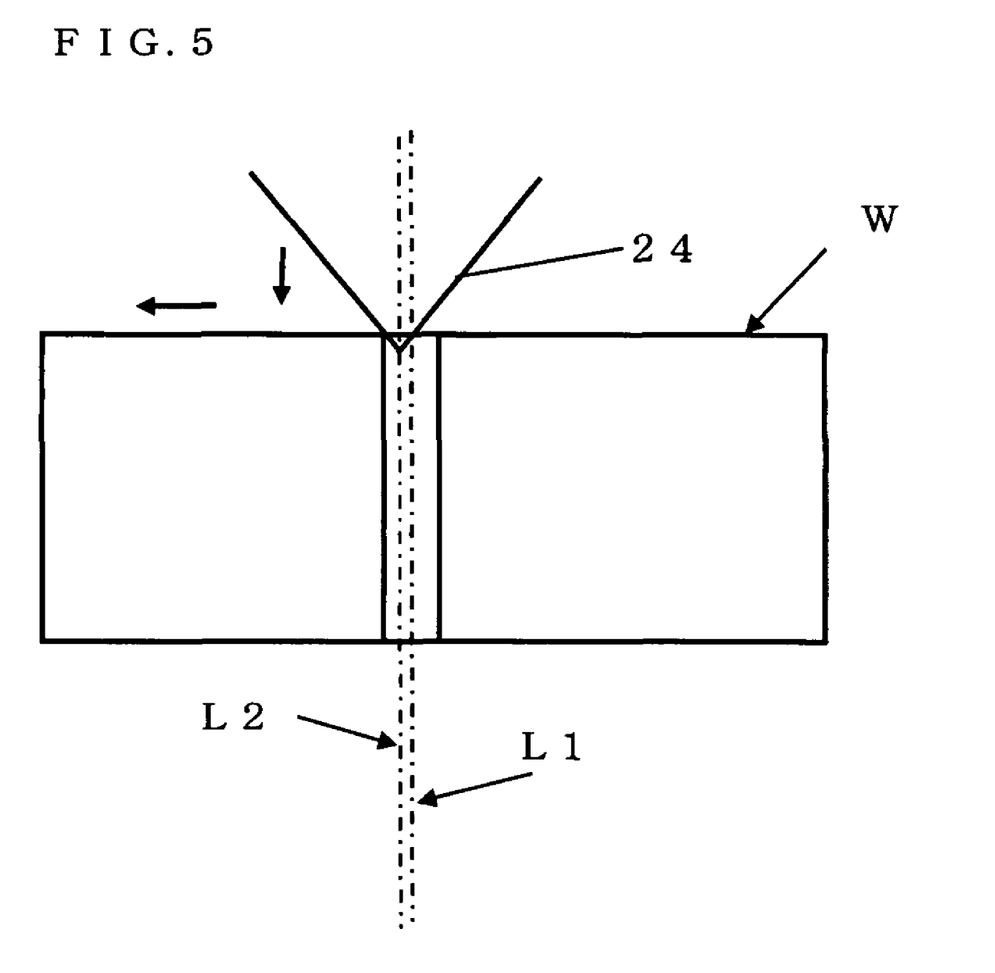
FIG. 5 is an explanatory view for explaining an expanded hole drilling method of the present invention, showing a state in which the tip end of a centering member shifts from the center of a hole initially in a centering step.
Figure 6:
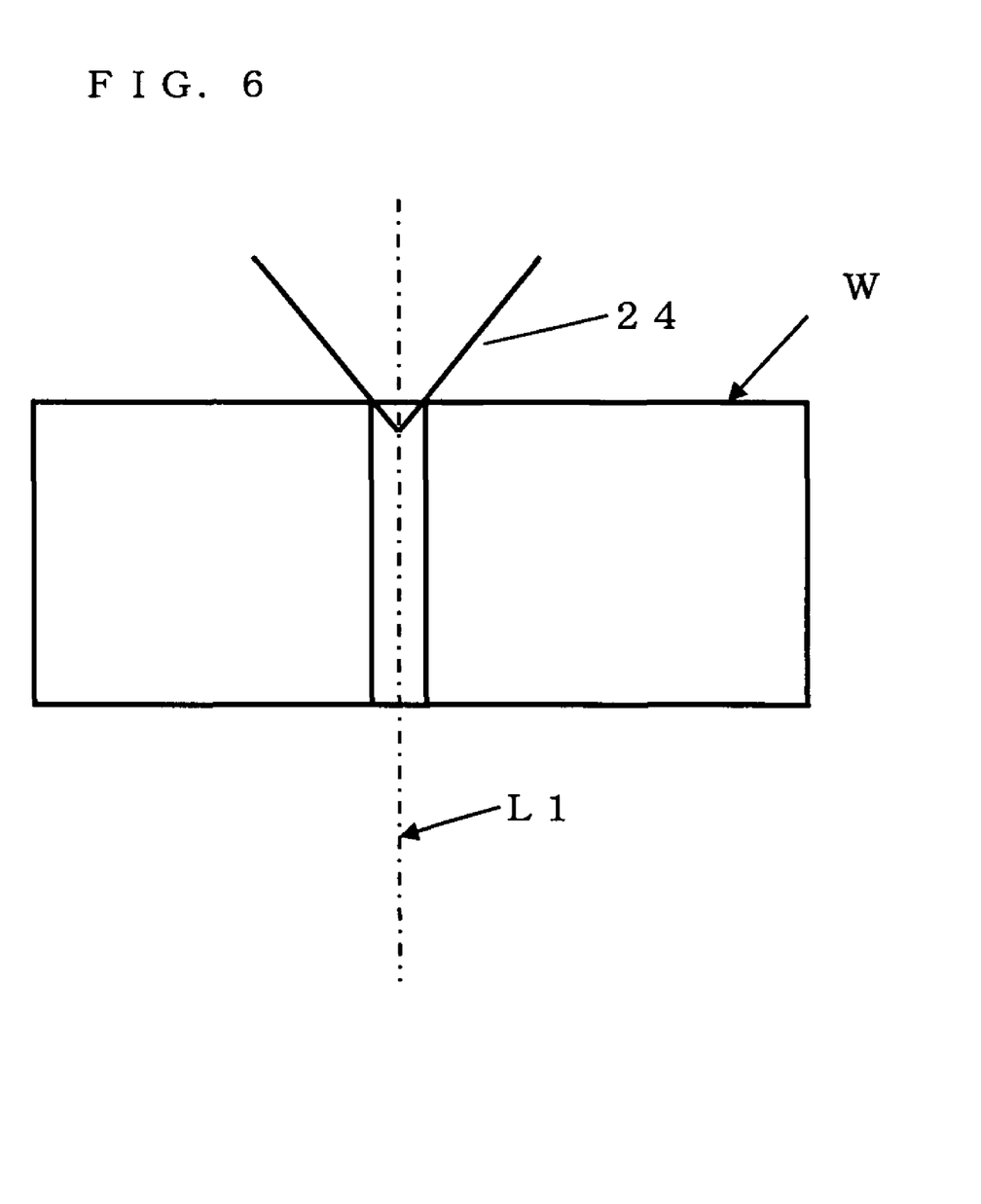
FIG. 6 is an explanatory view for explaining an expanded hole drilling method of the present invention, showing a state in which the tip end of a centering member coincides with the center of a hole finally in a centering step.

This centering process is work for causing the axis line of hole to be expanded to coincide with the axis line of the hole 30a. At this time, as shown in FIG. 5, even if the axis line of the centering attachment 24 (indicated by an arrow mark L2 in FIG. 5) shifts from the axis line of the hole 30a (the centerline, indicated by an arrow mark L1 in FIG. 5) when the tip end part of the centering member begins to be inserted, the wall of the hole 30a is pressed by the tip end part of the centering attachment 24 that is pushed down and inserted into the hole 30a, so that the workpiece W in a displaceable state is displaced in the left direction in FIG. 5. Thereby, as shown in FIG. 6, the axis line L1 of the hole 30a is moved in the left direction and caused to coincide with the axis line L2 of the centering attachment 24.

Figure 7:
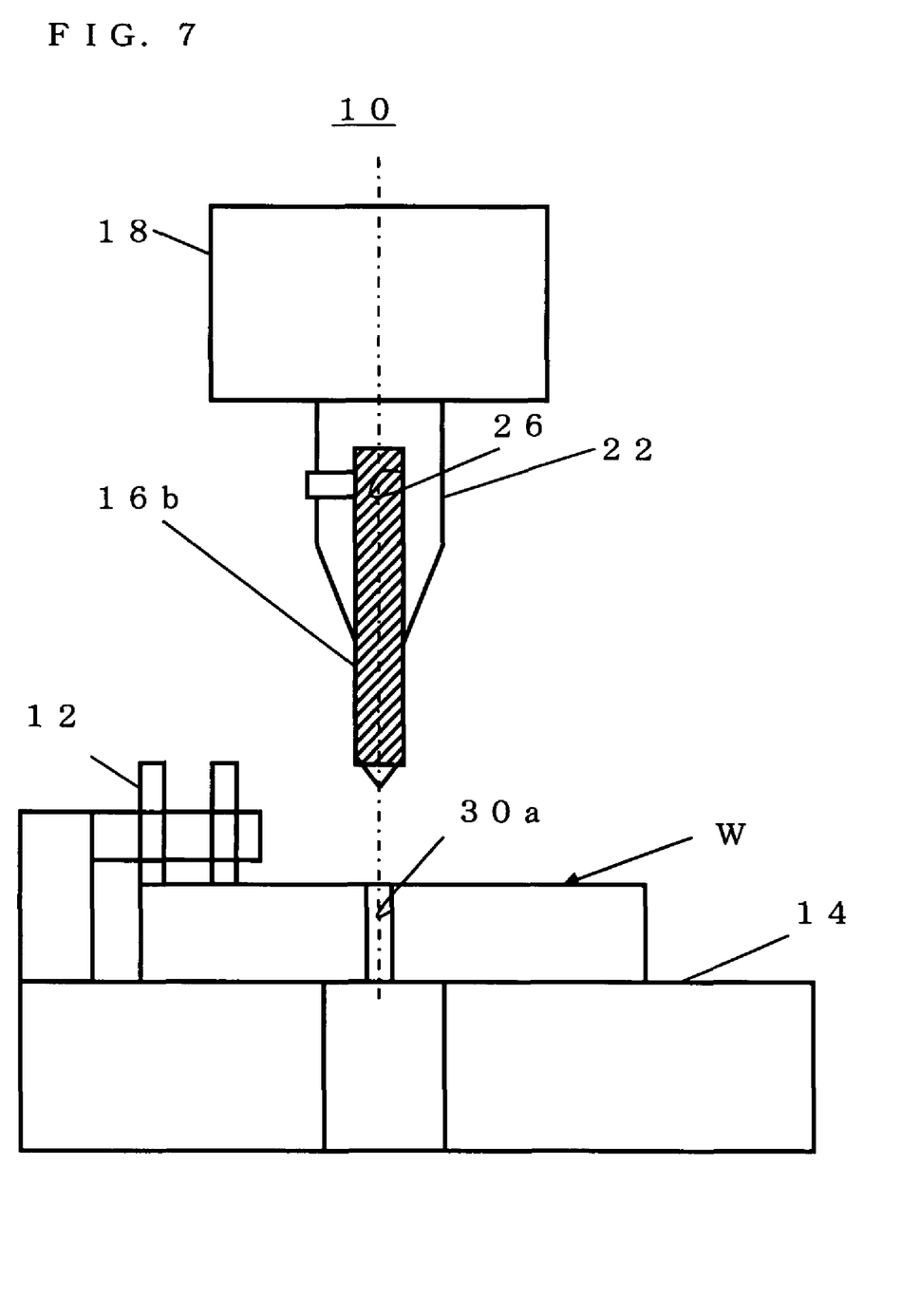
FIG. 7 is an explanatory view for explaining an expanded hole drilling method of the present invention, showing a state of an expanded hole drilling device in a fixing step of fixing a workpiece on a table and exposing a drill by removing a centering member.

Next, in the fixing step, the workpiece W in a centered state is fixed at the position thereof on the table 14 by the fixing element 12 (refer to the state of the fixing element 12 shown in FIG. 7).

Figure 8:
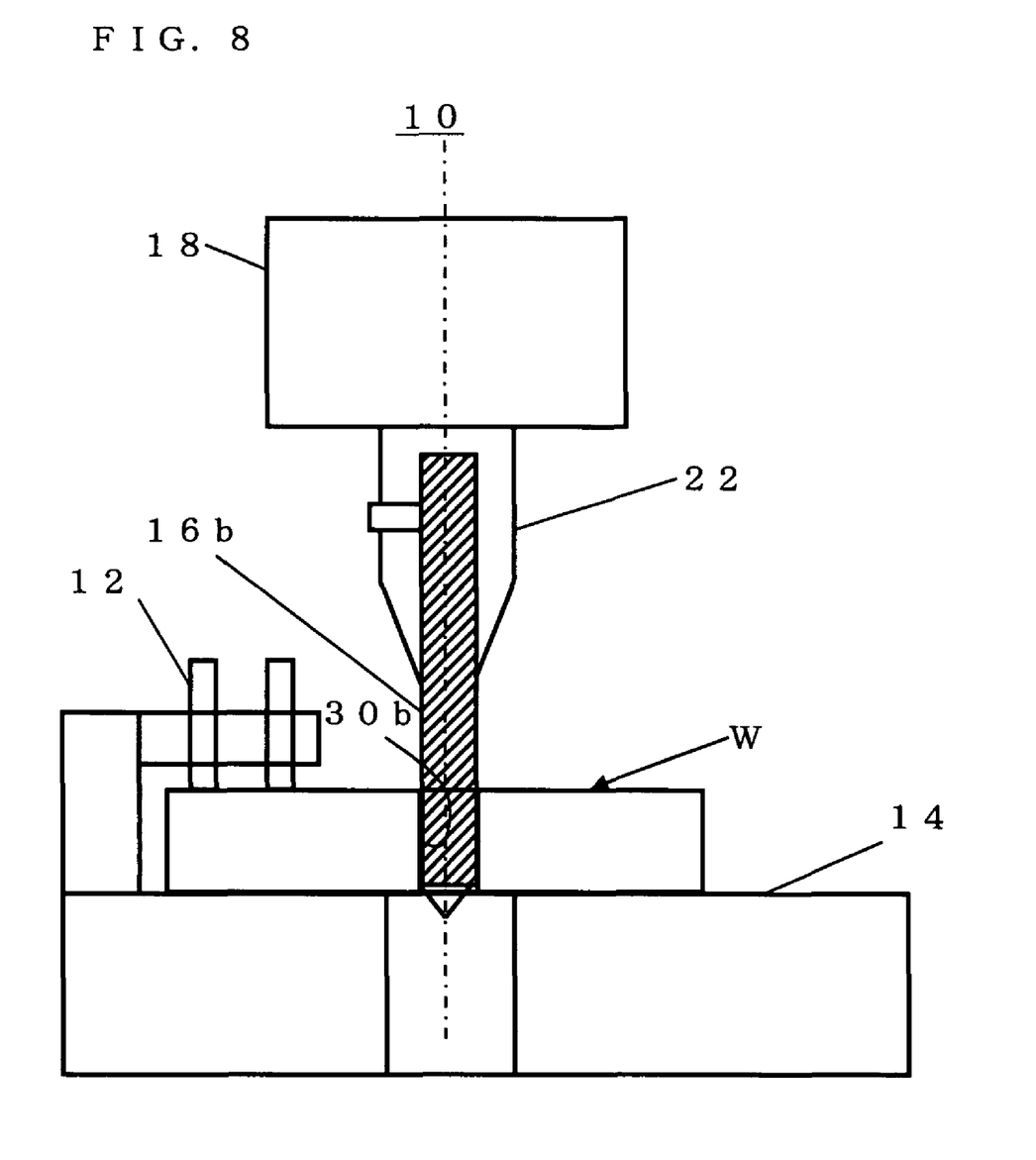
FIG. 8 is an explanatory view for explaining an expanded hole drilling method of the present invention, showing a state of an expanded hole drilling device in a drilling step of expanding a hole.
Figure 9:
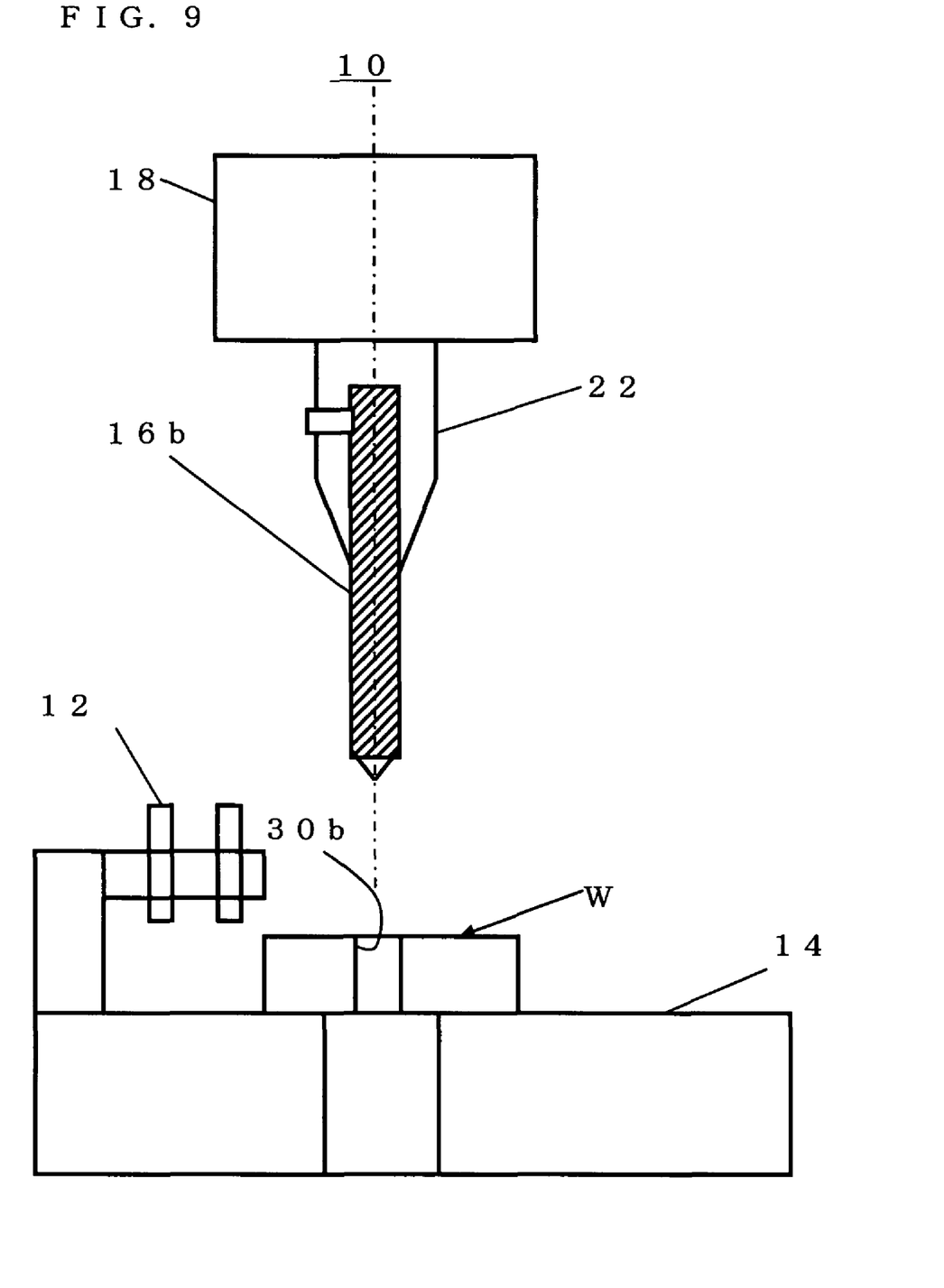
FIG. 9 is an explanatory view for explaining an expanded hole drilling method of the present invention, showing a state of an expanded hole drilling device at the time when a drill is pulled out of a workpiece after a drilling step has been finished.

Finally, in the drilling step, as shown in FIG. 7, the centering attachment 24 is removed from the drill holder 22 to expose the drill 16b. Then, as shown in FIG. 8, the workpiece W is drilled by using the drill 16b to expand the hole 30a and form a hole 30b. By pulling the drill 16b out of the workpiece W as shown in FIG. 9, the drilling of the expanded hole (hole 30b) in the workpiece W is finished.

According to the expanded hole drilling device 10, the component 20 for the expanded hole drilling device, and the expanded hole drilling method of the present invention having been explained above, an expanded hole can be formed without causing decentering. Also, an expanded hole without decentering can be formed by using a low-cost and simple expanded hole drilling device.

In the expanded hole drilling method of the present invention, the hole 30b may be formed by forming the hole 30a in the state in which the drill 16a is attached to the drill holder 22, performing centering by fitting the centering attachment 24 on the drill 16a, and then replacing the drill 16a with the drill 16b when the centering attachment 24 is removed from the drill holder 22.

Also, at this time, the drill 16a having been used to form the hole 30a in the state of being attached to the drill holder 22 may be replaced with the drill 16b and the centering attachment 24 may be put on the drill 16b to perform centering.

Figure 10:
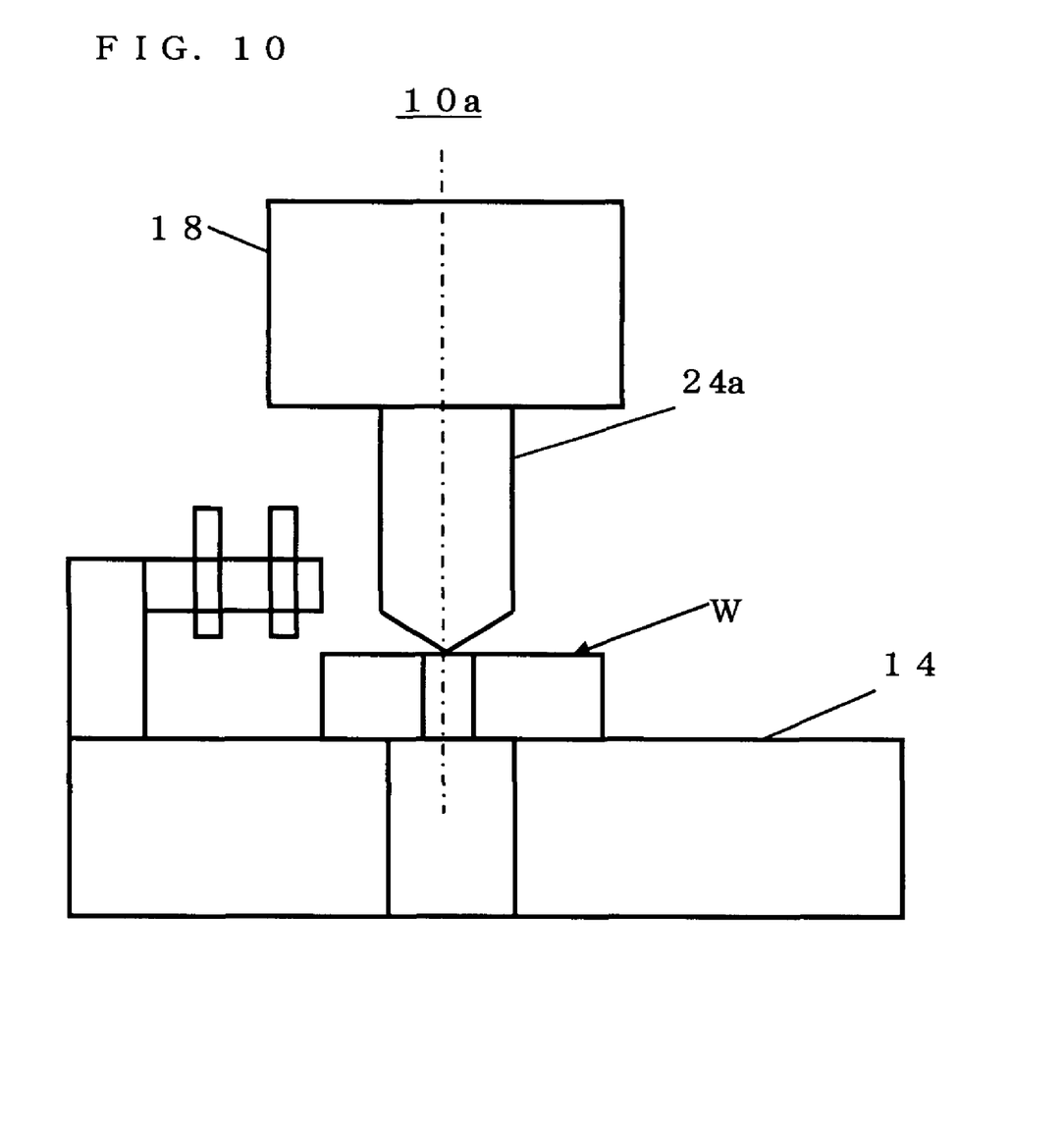
FIG. 10 is a schematic view showing a state of centering in another example of an expanded hole drilling device of the present invention.

Also, the expanded hole drilling device of the present invention may be constructed so that the drill holder is omitted as in an expanded hole drilling device 10a shown in FIG. 10, and a centering attachment 24a is attached directly to the drill grasping part 18. By using this expanded hole drilling device 10a, the centering may be performed.

Figure 11:
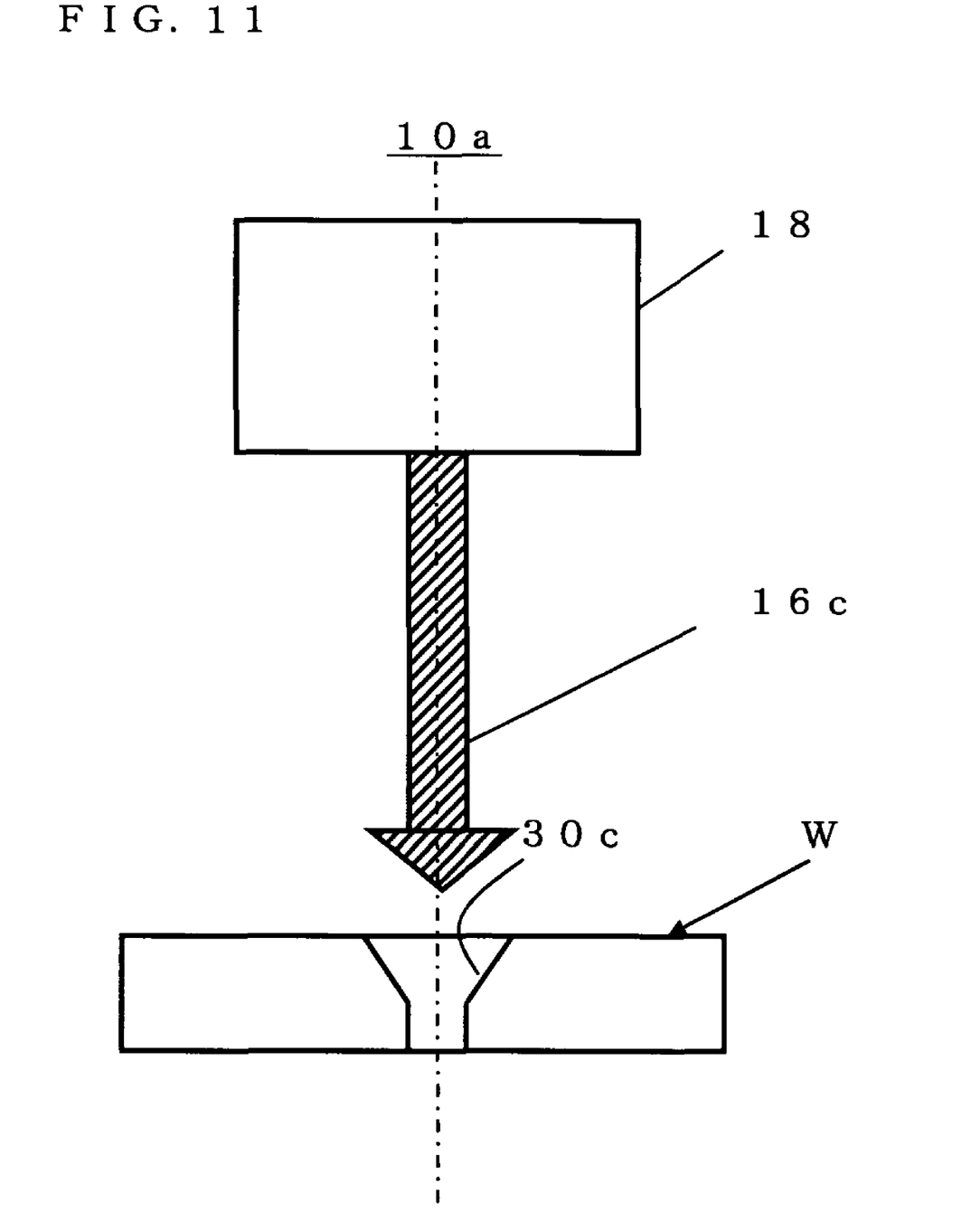
FIG. 11 is a schematic view showing a state of countersinking in still another example of an expanded hole drilling device of the present invention.

In this case, each time drilling is performed, the drill is replaced by detaching the centering attachment 24a. As shown in FIG. 11 taking a countersinking process as an example, to form a hole 30c having a dish-shaped opening coinciding with the shape of the screw head, a drill 16c for countersinking is attached to the drill grasping part 18 from which the centering attachment 24a has been removed.

The invention claimed is:

1. An expanded hole drilling device comprising a table having a fixing element for detachably fixing a bored workpiece; and a hole drilling part having a drill grasping part to which a drill capable of drilling a hole having a diameter larger than that of a bored hole is attached, characterized in that the device has a drill holder attached to the drill grasping part in place of the drill; and a centering attachment having a diameter larger than that of the drill holder, the centering attachment being attached to the free end part of the drill holder on the side opposite to the side on which the drill holder is attached to the drill grasping part, the free end part of the drill holder is formed into a conical shape having the same axis line as that of the drill at the time when being attached to the drill grasping part, and a hole part in which the drill is insertably fitted is formed in the free end part, the hole part having the same axis line as that of the conical shape, and for the centering attachment, in the end part on the side of being attached to the free end part of the drill holder, there are formed a taper-shaped opening in which the free end part of the drill holder is insertably fitted, the taper-shaped opening having the same axis line as that of the drill holder, and a hole part that communicates with the taper-shaped opening and has a space capable of accommodating the exposed part of the drill attached to the drill holder, and also the other end part is formed into a conical shape having the same axis line as that of the hole part.

2. A component for an expanded hole drilling device consisting of a drill holder attached to a drill grasping part in place of a drill; and a centering attachment having a diameter larger than that of the drill holder, the centering attachment being attached to the free end part of the drill holder on the side opposite to the side on which the drill holder is attached to the drill grasping part, characterized in that the free end part of the drill holder is formed into a conical shape having the same axis line as that of the drill at the time when being attached to the drill grasping part, and a hole part in which the drill is insertably fitted is formed in the free end part, the hole part having the same axis line as that of the conical shape, and for the centering attachment, in the end part on the side of being attached to the free end part of the drill holder, there are formed a taper-shaped opening in which the free end part of the drill holder is insertably fitted, the taper-shaped opening having the same axis line as that of the drill holder, and a hole part that communicates with the taper-shaped opening and has a space capable of accommodating the exposed part of the drill attached to the drill holder are formed, and also the other end part is formed into a conical shape having the same axis line as that of the hole part.

* * * * *